United States Patent
Thoreau et al.

(10) Patent No.: US 8,755,618 B2
(45) Date of Patent: Jun. 17, 2014

(54) METHOD FOR CODING AND METHOD FOR RECONSTRUCTION OF A BLOCK OF AN IMAGE SEQUENCE AND CORRESPONDING DEVICES

(75) Inventors: Dominique Thoreau, Cesson Sevigne Cedex (FR); Aurelie Martin, Paris (FR); Edouard Francois, Bourg des Comptes (FR); Jerome Vieron, Paris (FR); Safa Cherigui, Cesson Sevigne Cedex (FR)

(73) Assignee: Thomson Licensing, Issy Les Moulineaux (FR)

( * ) Notice: Subject to any disclaimer, the term of this patent is extended or adjusted under 35 U.S.C. 154(b) by 86 days.

(21) Appl. No.: 13/638,625

(22) PCT Filed: Mar. 28, 2011

(86) PCT No.: PCT/EP2011/054682
§ 371 (c)(1),
(2), (4) Date: Dec. 17, 2012

(87) PCT Pub. No.: WO2011/120894
PCT Pub. Date: Oct. 6, 2011

(65) Prior Publication Data
US 2013/0136372 A1  May 30, 2013

(30) Foreign Application Priority Data
Apr. 2, 2010 (FR) ...................... 10 52517

(51) Int. Cl.
*G06K 9/36* (2006.01)
*G06K 9/46* (2006.01)

(52) U.S. Cl.
USPC ........................................ 382/238

(58) Field of Classification Search
USPC ............. 382/190, 232, 233, 236, 238, 294; 375/147, 342, 343, 240.16
See application file for complete search history.

(56) References Cited

U.S. PATENT DOCUMENTS

| | | | | |
|---|---|---|---|---|
| 5,581,638 A | * | 12/1996 | Givens et al. | 382/294 |
| 7,602,864 B1 | * | 10/2009 | Hu et al. | 375/343 |
| 8,233,730 B1 | * | 7/2012 | Namboodiri et al. | 382/236 |
| 8,340,189 B1 | * | 12/2012 | Krupiczka et al. | 375/240.16 |
| 2013/0136372 A1 | * | 5/2013 | Thoreau et al. | 382/233 |

OTHER PUBLICATIONS

Martin etal: "Phase refinement for image prediction based on sparse representation", Proceedings of the SPIE, vol. 7543, Jan. 19, 2010, pp. 75430H-1.

(Continued)

*Primary Examiner* — Amir Alavi
(74) *Attorney, Agent, or Firm* — Robert D. Shedd; Patricia A. Verlangieri (57) ABSTRACT

A method for coding a current block is disclosed. The method comprises an iterative step of decomposition into atoms of a first dictionary of a vector of data comprising at least reconstructed image data associated with pixels situated in a causal neighboring area of a current block.

At each iteration, the step of decomposition into atoms comprises the following steps for:
 selecting a first atom in the first dictionary of atoms,
 applying a phase correlation between a patch associated with the first atom and a current residue vector, when the first atom is a textured atom,
 extracting from the patch at least the part most correlated with the residue vector, the extracted part forming a second atom,
 selecting from among the first atom and the second atom, the atom most correlated with the current residue vector, and
 updating the residue vector according to the selected atom.

14 Claims, 8 Drawing Sheets

(56) References Cited

OTHER PUBLICATIONS

Jost et al: "Tree-Based Pursuit: Algorithm and Properties", IEEE, vol. 54, No. 12, Dec. 1, 2006, pp. 4685-4697.

Peyre: "Sparse Modeling of Textures", Journal of Mathematical Imaging and Vision, vol. 34, No. 1, Nov. 6, 2008, pp. 17-31.

Search Report Dated May 5, 2011.

* cited by examiner

METHOD FOR CODING AND METHOD FOR RECONSTRUCTION OF A BLOCK OF AN IMAGE SEQUENCE AND CORRESPONDING DEVICES

1. SCOPE OF THE INVENTION

The invention relates to the general domain of image coding.

The invention relates to a method for coding a block of a sequence of images and a corresponding method for reconstructing such a block.

2. PRIOR ART

Figure 1:
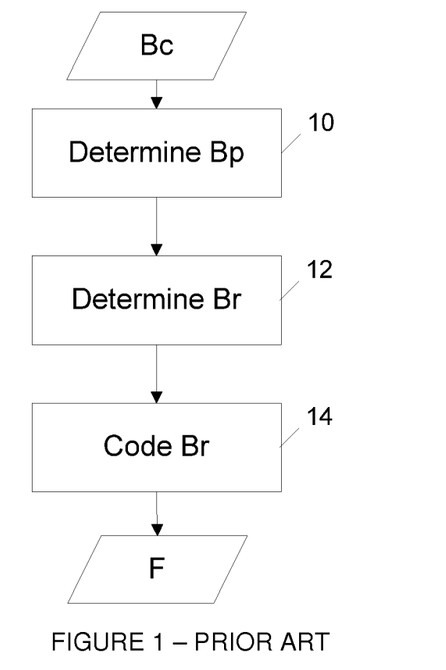
FIG. 1 shows a coding method according to the prior art.

In reference to FIG. 1, it is known in the art to code a current block Bc of pixels of a current image belonging to a sequence of several images by spatial or temporal prediction. For this purpose, it is known in the art to determine for the current block Bc to be coded a prediction block Bp from pixels spatially neighbouring the current block previously reconstructed in the case of spatial prediction or from pixels of images other than the current image previously reconstructed, called reference images.

During a step 12, the residue block Br is determined by extracting from the current block Bc, the prediction block Bp.

During a step 14, the residue block is coded in a stream F. This step of coding generally comprises, the transformation of the residue block into a block of coefficients, the quantizing of these coefficients and their entropy coding in a stream F.

Figure 2:
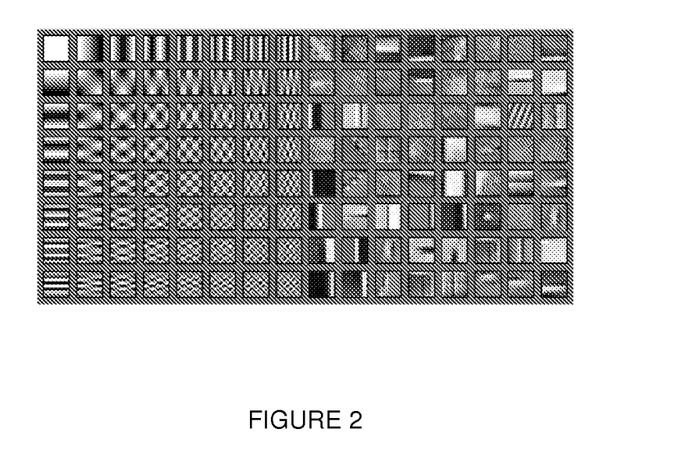
FIG. 2 shows a dictionary of atoms comprising analytical and textured atoms.

To determine the prediction block Bp, it is known in the art to apply an iterative method of atomic decomposition such as "matching pursuit" to a vector of data comprising at least reconstructed image data of blocks neighbouring said current block. The atomic decomposition comprises the selection, in an iterative way, of atoms in a dictionary of atoms. Typically the dictionary comprises atoms called analytical or theoretical atoms, i.e. corresponding to basic functions of a transform, for example DCT (Discrete Cosine Transform) or DFT (Discrete Fourier Transform). The analytical or theoretical atoms are perfectly described by their mathematical formulations. In FIG. 2, these analytical atoms form the 8 first columns of the dictionary of atoms. The relevance of the prediction block, i.e. its fidelity to the current block, depends strongly on the atoms present in the dictionary. In order to improve the prediction, it is possible to increase the size of the dictionary by adding texture samples from natural textures, called textured atoms. In FIG. 2, these textured atoms form the 8 last columns of the dictionary of atoms. They are for example extracted from natural or synthesis images.

This increase in the size of the dictionary induces an increase in the calculation cost. In fact, during the atomic decomposition, more atoms must be tested.

3. SUMMARY OF THE INVENTION

The purpose of the invention is to overcome at least one of the disadvantages of the prior art. For this purpose, the invention relates to a method for coding a current block of a sequence of images comprising the following steps for:

decomposing iteratively, into atoms of a first dictionary, a vector of data comprising at least reconstructed image data associated with pixels located in a causal neighbourhood of the current block, the first dictionary comprising analytical atoms and textured atoms, and extracting from the decomposed vector data corresponding to the current block, the extracted data forming a prediction block, determining a residue block by extracting from the current block the prediction block, and coding the residue block.

At each iteration the step of decomposition into atoms comprises the following steps for:

selecting a first atom in the first dictionary of atoms, applying a phase correlation between a patch associated with the first atom and a current residue vector, when the first atom is a textured atom, extracting from the patch at least the part most correlated with the residue vector, the extracted part forming a second atom, selecting from among the first atom and the second atom, the atom most correlated with the current residue vector, and updating the residue vector according to the selected atom.

Advantageously, the coding method according to the invention enables a great number of atoms to be tested due to the use of patches. These patches enable, for a first selected textured atom, to test numerous re-phased atoms with respect to this textured atom due particularly to the step of phase correlation.

To test the same number of atoms with one of the methods of the prior art, it would be necessary to increase the size of the first dictionary inserting re-phased atoms for each textured atom. However, the decomposition into atoms from such an enlarged dictionary is a lot more costly. For example, in the case of a decomposition based on a matching pursuit type algorithm, this approach requires at least one scalar product to be carried out for each atom of the first dictionary which is a lot more costly than to do the scalar products on a first dictionary of reduced size and to test several re-phased atoms by a simple phase correlation using a second dictionary as is done in the coding method of the invention.

In addition, the fact of testing numerous re-phased atoms using the second dictionary enables the number of iterations to be reduced.

According to a particular characteristic of the invention, the patches of the second dictionary are of circular symmetry.

According to another particular characteristic of the invention, the patches of the second dictionary have a form that depends on their content.

According to a particular characteristic, the second dictionary comprises at least two patches of different sizes.

According to an embodiment variant, the step of extraction comprises the extraction of the N parts most correlated with the residue vector, each part extracted forming a re-phased atom and the step of selection comprises the selection, from among the first atom and the re-phased atoms, of the atom most correlated with the current residue vector.

The invention also relates to a method for reconstruction of a current block of a sequence of images in the form of a stream comprising the following steps for:

decoding a residue block for the current block from the stream, decomposing iteratively, into atoms of a first dictionary, a vector of data comprising at least reconstructed image data associated with pixels located in a causal neighbourhood of the current block, the first dictionary comprising analytical atoms and textured atoms, extracting from the decomposed vector data corresponding to the current block, the extracted data forming a prediction block, and reconstructing the current block by merging the decoded residue block and the prediction block.

At each iteration, the step of decomposition into atoms comprises the following steps for:
selecting a first atom in the first dictionary of atoms,
applying a phase correlation between a patch associated with the first atom and a current residue vector, when the first atom is a textured atom,
extracting from the patch at least the part most correlated with the residue vector, the extracted part forming a second atom,
selecting from among the first atom and the second atom, the atom most correlated with the current residue vector, and
updating the residue vector according to the selected atom.

The same advantages as those mentioned in reference to the coding method apply to the method for reconstruction.

According to a particular characteristic of the invention, the patches of the second dictionary are of circular symmetry.

According to another particular characteristic of the invention, the patches of the second dictionary have a form that depends on their content.

According to a particular characteristic, the second dictionary comprises at least two patches of different sizes.

According to an embodiment variant, the step of extraction comprises the extraction of the N parts most correlated with the residue vector, each part extracted forming a re-phased atom and the step of selection comprises the selection, from among the first atom and the re-phased atoms, of the atom most correlated with the current residue vector.

4. LIST OF FIGURES

The invention will be better understood and illustrated by means of embodiments and advantageous implementations, by no means limiting, with reference to the figures in the appendix, wherein.

5. DETAILED DESCRIPTION OF THE INVENTION

An image comprises pixels or image points with each of which is associated at least one item of image data. An item of image data is for example an item of luminance data or an item of chrominance data.

The term "residue" designates the data obtained after extraction of other data. The extraction is generally a subtraction of prediction pixels from source pixels. However, the extraction is more general and comprises notably a weighted subtraction.

The term "reconstructs" designates data (for example pixels, blocks) obtained after merging of residues with prediction data. The merge is generally a sum of residue prediction pixels. However, the merging is more general and comprises notably the weighted sum. A reconstructed block is a block of reconstructed pixels.

In reference to image decoding, the terms "reconstruction" and "decoding" are very often used as being synonymous. Thus, a "reconstructed block" is also designated under the terminology of "decoded block".

The method for coding according to the invention is based on a method for atomic decomposition. Various methods exist enabling an atomic decomposition to be obtained from a signal Y. Among them, one of the most well known is identified under the term "matching pursuit". Note that variants of "matching pursuit" can be used such as "orthogonal matching pursuit" or "Global Matched Filter".

The general principle of atomic decomposition and of "matching pursuit" is described hereafter. Let Y be a source vector of dimensions N and A a matrix of dimensions N×M with M>>N. The columns $a_j$ of A are the atoms, analytical or textured, of a dictionary that are used to represent the source vector Y. The purpose of the atomic decomposition of the source signal Y is to determine the vector X of dimension M such that Y=AX. There are an infinity of solutions for the vector X. The purpose of parsimonious representations is to search among all the solutions of Y=AX, for those that are parsimonious, i.e. those for which the vector X has only a low number of non-null coefficients. The search for the exact solution is too complex in practice as it requires a very costly combinatory approach. In general, a parsimonious representation is sought instead that verifies $N(Y-AX) \leq \rho$, where $\rho$ is a tolerance threshold that controls the parsimony of the representation and where N(•) is for example the squared norm L2. Naturally, N(•) can be a norm other than the norm L2.

The method of "Matching Pursuit" (MP) enables such a sub-optimal, i.e. non-exact solution to be obtained, using an iterative method. The method generates at each iteration k, a representation $X_k$, dimension vector M, having a number of non-null coefficients that increases in general (except if the same atom is selected during several iterations) at each new iteration k. The MP method is described in detail in reference to FIG. 3.

Figure 3:
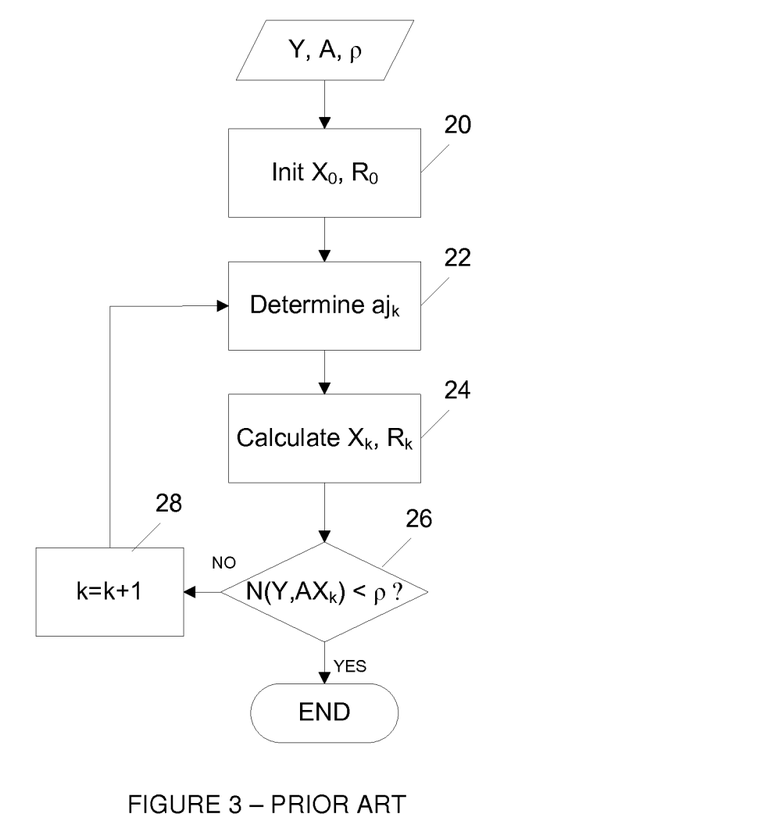
FIG. 3 shows a method for atomic decomposition according to the prior art.

The known data are the source signal Y, the dictionary A and the threshold p. During an initialisation step 20 (iteration k=0), the data $X_0$ and $R_0$ are initialised, where $R_0$ is an initial vector of residual error or residue vector. For example, $X_0=0$ and the initial vector of residual error or residue vector $R_0$ is initialised as follows: $R_0=Y-AX_0=Y$.

During a step 22, corresponding to the $k^{th}$ iteration, the base function $a_{j_k}$ having the highest correlation with the current residue vector $R_{k-1}$ is selected, where $R_{k-1}=Y-AX_{k-1}$.

$$j_k = \mathrm{argmax}_j |\langle R_{k-1}, a_j \rangle| = \mathrm{argmax}_j \frac{(a_j^T R_{k-1})^2}{a_j^T a_j},$$

where <•> is the scalar product operator.

During a step 24, the vector $X_k$ and the residue vector $R_k$ are updated.

The coefficient $x_{j_k}$ of the vector $X_k$ is calculated according to the following formula:

$$x_{j_k} = \frac{a_{j_k}^T R_{k-1}}{a_{j_k}^T a_{j_k}} = |\langle R_{k-1}, a_{j_k} \rangle|$$

The residue vector $R_k$ is updated according to the following formula:

$$R_k = R_{k-1} - x_{j_k} a_{j_k} = R_{k-1} - \frac{a_j^T R_{k-1}}{a_j^T a_j} a_{j_k}$$

The coefficient $x_{j_k}$ that has just been calculated is added to $X_{k-1}$ to thus form the new representation $X_k$ During a step 26, there is a check to see if the stopping criterion is satisfied. If $N(Y-AX_k) \le \rho$ then the procedure is terminated if not k is incremented by 1 during a step 28 and the procedure resumes at step 22. The final vector $AX_K$ is an approximation of the source signal Y, where K is the index of the last iteration.

Figure 4:
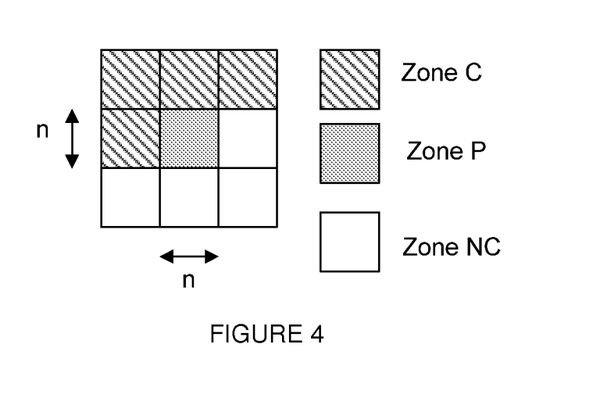
FIG. 4 shows a group of blocks of an image.

In FIG. 4, blocks of pixels of size n×n are shown. The integer "n" can take different values such as for example 4, 8, 16, etc. The greyed block (zone P) represents the current block to be predicted, the hatched block (zone C) represents the causal zone and the white zone (zone NC) represents the non-causal zone. The causal zone comprises pixels coded and reconstructed previous to the coding of the current block. The definition of the causal zone depends on the order of coding of blocks in the image. In FIG. 4, the blocks are assumed to be coded according to a standard coding order known as "raster scan". The invention is however in no way limited to this coding order. The coding method according to the invention comprises the atomic decomposition of an observation vector Y formed of pixels of the zone L scanned in line, with L=C∪P∪NC. The vector Y is thus a vector of size $9n^2 \times 1$. In practice, the atomic decomposition is applied to a vector Ye comprising the image data associated with the pixels of zone C, possibly to image data associated with the pixels of the zone, for example by a preliminary prediction step. In fact, the image data of other pixels of the zone L are not known and are considered as null.

Figure 5:
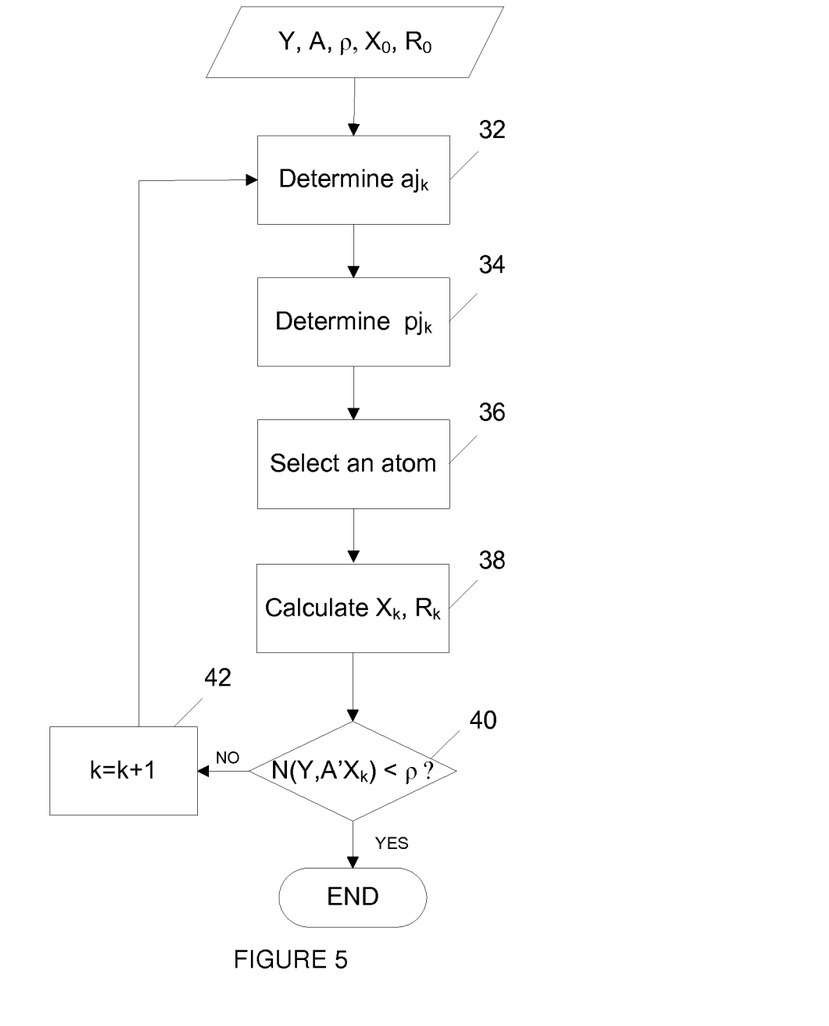
FIG. 5 shows a method for atomic decomposition refined according to the invention.

FIG. 5 shows a method for atomic decomposition refined according to the invention. The atomic decomposition method refined according to the invention uses two dictionaries. The first dictionary A comprises the analytical and/or textured atoms typically used by MP type methods. For example, the analytical atoms are two-dimensional base functions of the same size as the zone L (3n×3n), and that are assumed to have correct properties for the decomposition of a signal into elementary signals. For example, the kernel of usual transforms, such as the DCT (Discrete Cosine Transform) or the DFT (Discrete Fourier Transform) is used to define the analytical atoms. In these specific cases, a frequency decomposition of the signal is operated. The expressions of base functions or analytical atoms associated with the DFT and the DCT, respectively, are the following:

$$g_{P,g}(m, n) = e^{2i\pi\left(\frac{mp}{M} + \frac{nq}{N}\right)}$$

and $$g_{P,q}(m, n) = \cos\left(\frac{p\pi(2m+1)}{2M}\right)\cos\left(\frac{q\pi(2n+1)}{2N}\right)$$

The dictionary A is completed by textured atoms of the same size as the analytical atoms. The dictionary A must comprise at minimum $9n^2$ atoms to represent the zone L. In order to be able to contain $9n^2$ two-dimensional atoms for which the size of each is 3n×3n in a 2D matrix, the atoms are vectored. Thus, the dictionary A is constituted of a minimum of $9n^2$ columns each of which represents an analytical or textured atom, of size $9n^2 \times 1$. A designates both the dictionary and the corresponding matrix.

The choice of DCT and DFT atoms is not a limitation. In fact, the dictionary can be enriched from any base functions able to represent any pattern type in an image (Gabor atoms, anisotropic atoms, etc.) The number of atoms or again, the number of columns in the matrix A has as a minimum value, the size of the vectored zone L (i.e. $9n^2$) but does not have a theoretical maximum value. The more the quantity of atoms is great, the more chance there is of recovering the signal.

The second dictionary is formed of patches that are bigger than the atoms of the first dictionary. These patches like the textured atoms come from natural images. More specifically, with each textured atom of the first dictionary or with each textured atom of a part only of the first dictionary is associated a patch of the second dictionary. The patches of the second dictionary are for example extracted from natural or synthetic images. The patches can be of rectangular form. According to a variant, the form of the patch depends on the content. For example, if the patch comprises essentially vertical structures, it will be rectangular preferably wider than it is high. In the contrary case, i.e. if it comprises essentially horizontal structures, it will be rectangular preferably higher than it is wide. Likewise, the patches can be of circular symmetry. Advantageously, the textured atoms of the first dictionary are obtained by extracting a textured atom from each patch of the second dictionary, for example the textured atom is centred in the patch. The size of patches of the second dictionary can also vary from one patch to another. However the fact that the textured atom is centred in the patch has no mandatory character. Likewise, the invention is in no way limited by the way in which the textured atoms are generated from patches, or by the way the patches are determined from natural images. Like the MP method described previously in reference to FIG. 3, the method for atomic decomposition according to the invention is an iterative method.

During a step 32, a first atom $a_{j_k}$ is selected in the first dictionary of atoms for example according to step 22 of the MP method. When the atom $a_{j_k}$ is a textured atom and a patch of the second dictionary is associated with it, then the method continues to step 34. When the atom $a_{j_k}$ is an analytical atom or a textured atom to which no patch corresponds, then the method continues to step 38. $a_{j_k}$ is the atom most strongly correlated with the current residue vector $R_{k-1}$, for example that for which the scalar product $|\langle R_{k-1}, a_{j_k} \rangle|$ is highest. This scalar product is noted as c_max.

During a step 34, a second atom $p_{j_k}$ is determined from the second dictionary. This step is shown in detail by FIG. 6.

Figure 6:
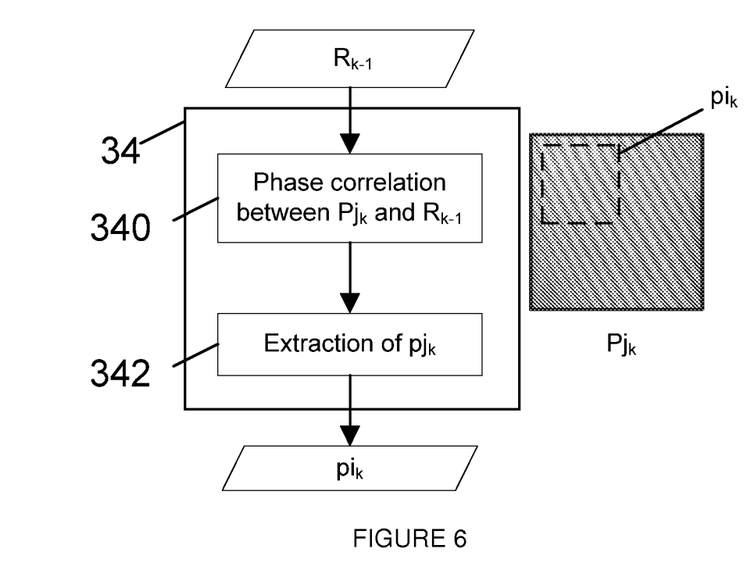
FIG. 6 shows a detail of the method for atomic decomposition according to the invention.

During a step 340, the residue vector $R_{k-1}$ used to determine $a_{j_k}$ is correlated, by phase correlation, with the patch $P_{j_k}$ of the second dictionary that corresponds to $a_{j_k}$. The phase correlation provides here a displacement (dx, dy) between the residue $R_{k-1}$ and the content of the patch $P_{j_k}$. This displacement determines the position of a new atom of the same size as the atoms of the first dictionary.

During a step 342, the part of the patch most correlated in terms of phase correlation with the residue vector $R_{k-1}$ is extracted from the patch. This extracted part is called the re-phased atom and noted as $p_{i_k}$.

According to a variant, the phase correlation provides N displacements (dx, dy) between the residue $R_{k-1}$ and the content of the patch $P_{j_k}$. These N displacements indicate the position of N parts of the patch most correlated in the sense of phase correlation with the residue vector $R_{k-1}$. These N parts are then extracted from the patch, each part extracted forming a re-phased atom. When the patches are of circular symmetry, the residue for the phase correlation can displace in a circular way over the patch set.

During a step 36, the atom most correlated with $R_{k-1}$ is selected from among $a_{j_k}$, and $p_{j_k}$, and possibly from $a_{j_k}$ and the N atoms re-phased when several re-phased atoms are extracted in step 342. For example, the correlation c_max, i.e. $|\langle R_{k-1}, a_{j_k} \rangle|$ and the correlation, noted as c_phase, associated with the second atom, i.e. $|\langle R_{k-1}, a_{j_k} \rangle|$ are compared. If c_phase>c_max, then the second atom $p_{i_k}$ is selected if not the first atom $a_{j_k}$ is selected. In the case of N re-phased atoms, the atom selected is the atom most correlated $R_{k-1}$, to the sense of the scalar product between the atom in question and $R_{k-1}$.

During a step 38, the vector $X_k$ and the residue vector $R_k$ are updated according to the atom selected. The coefficient $x_{i_k}$ of the vector $X_k$ is calculated according to the following formula $x_{i_k}=|\langle R_{k-1},p_{i_k}\rangle|$ when $p_{i_k}$ is selected and the coefficient $x_{j_k}$ of the vector $X_k$ is calculated according to the following formula $x_{j_k}=|\langle R_{k-1},a_{j_k}\rangle|$ when $a_{j_k}$ is selected. The residue $R_k$ is updated as follows: $R_k=R_{k-1}-x_{i_k}p_{i_k}$ or as follows $R_k=R_{k-1}-x_{j_k}a_{j_k}$ according to the atom selected. During a step 40, there is a check to see if the stopping criterion is satisfied. If $N(Y-A'X_k)\leq\rho$ then the method is terminated if not k is incremented by 1 during a step 42 and the method resumes at step 32. A' comprises the atoms of the first dictionary and possibly atoms selected from the second dictionary. The final vector $A'X_K$ is an approximation of the source signal Y where K is the index of the last iteration The method for refined atomic decomposition described in reference to FIGS. 5 and 6 is used to code a current block. The method for coding according to the invention is described in reference to FIG. 7.

During a step 52, an atomic decomposition is applied as described in reference to FIG. 5 on a vector Yp of size $4n^2\times1$ comprising as data the values of pixels of the observation zone, i.e. of neighbouring blocks (zone C in FIG. 4). According to a variant, an atomic decomposition is applied on a vector Ycp of size $5n^2\times1$ comprising as data the image data of pixels of the observation zone, i.e. of neighbouring blocks (zone C in FIG. 3) and the pixels of an initial prediction block Bp0 that has replaced the data of the current block to be predicted (zone P in FIG. 4). The data of other neighbouring blocks of the current block not previously reconstructed (zone NC on FIG. 3) are null. The initial prediction block is for example determined by a standard temporal prediction according to a standard block matching method. The invention is in no way limited by the definition of the observation zone. Hereafter the case of an atomic decomposition of the vector Yp is considered in the knowledge that the same decomposition can be applied to the vector Ycp. It is this observation vector Yp that is the prediction support useful to the MP method.

In order to be able to represent the data of Yp that is of dimensions $4n^2\times1$ (and not those of Y), the matrix A is modified by removing its lines corresponding to all the pixels outside the zone C. In fact, all these pixels are unknown and have a value of zero. A matrix is thus obtained, noted as $A_c$, compacted in the sense of the height, of size $4n^2\times9n^2$. The steps 32 to 40 described in reference to FIG. 5 are thus applied iteratively in order to determine $X_{opt}$ with as observation data the vector Yp. The method stops as soon as the stopping criterion $N(Y_C-A'_C X_k)\leq\rho$ is verified: $X_{opt}=X_K$, K being the index of the last iteration and $A'_c$ comprises the atoms of the first dictionary possibly atoms selected from the second dictionary compacted in the sense of the height. The final vector $\hat{Y}=A'X_{opt}$ is an approximation of the vector Y corresponding to the zone L.

Figure 8:
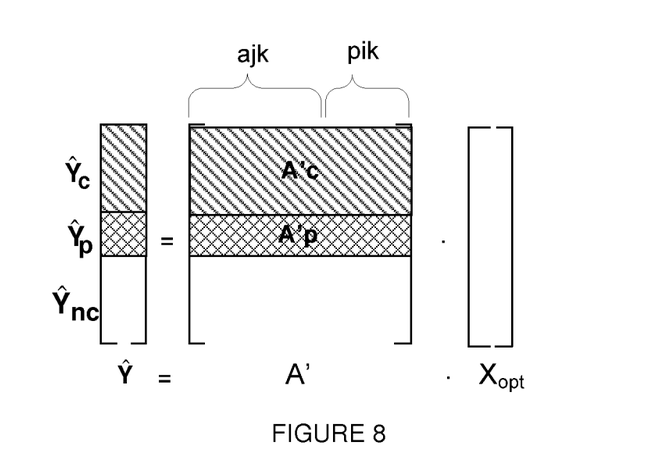
FIG. 8 shows particular elements of the coding method according to the invention.

During a step 54, the vector $\hat{Y}_p$ of size $n^2$ that corresponds to the zone P is extracted from $\hat{Y}$ as shown in FIG. 8. The data $\hat{Y}_p$ extracted are reorganised (inverse operation to the vectoring operations) in block form. The reorganised data represent the new prediction block Bp of the current block.

Figure 7:
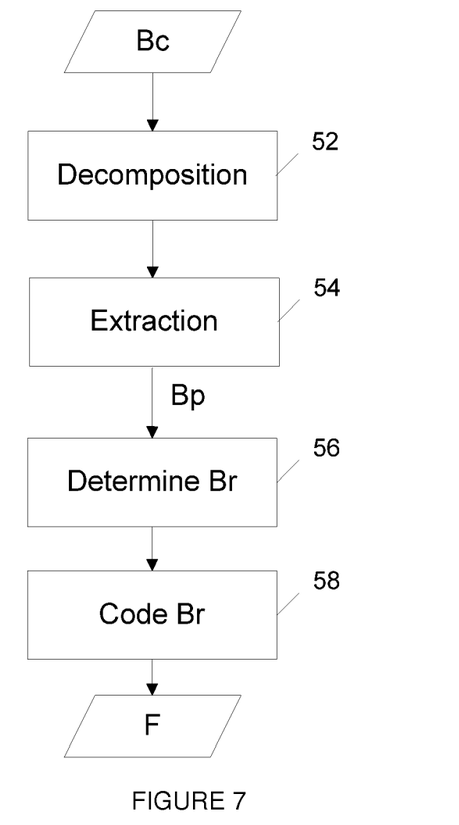
FIG. 7 shows a coding method according to the invention.

During a step 56, the residue block Br is determined by extracting from the current block Bc, the prediction block Bp.

During a step 58, the residue block is coded. This coding step generally comprises, the transformation of the residue block into a block of coefficients, the quantizing of these coefficients and their entropy coding in a stream F. According to a variant, it can comprise the quantizing of residues and their entropy coding in a stream F.

According to a variant, the set of sequences $X_k$ determined during the iterations are stored in the memory. According to this variant, $X_{opt}$ is not equal to $X_K$, K being the index of the last iteration but $X_{opt}=X_{k_{opt}}$ with $$k_{opt} = \min_{k\in[1,K]} N(Y_P - A'_P X_k)$$

where:
$A'_P$ is the matrix part A' associated with the zone P to be predicted, and
$Y_p$ is the vector of size $n^2\times1$ associated with the zone P to be predicted, i.e. comprising the image data of pixels of the zone P.

Ap and Yp are shown in FIG. 8. This variant enables $X_{opt}$ to be determined as being the best representation of the zone P that does not necessarily correspond to the best representation on the zone C. The data $A_p X_{k_{opt}}$ are reorganised (inverse operation to the vectoring operations) in block form. The reorganised data represent the new prediction block Bp of the current block. According to this variant, the coefficient $k_{opt}$ is also coded in the stream F. In fact, the data of the vector $Y_P$ are unknown to the decoder.

Figure 9:
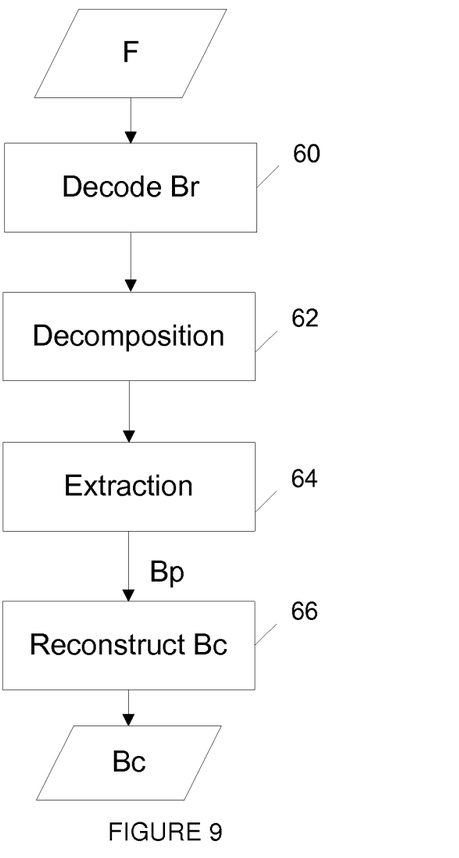
FIG. 9 shows a method for reconstruction according to the invention.

FIG. 9 diagrammatically shows a method for reconstruction of a current block according to the invention, During a step 60, a residue block Br is decoded for the current block. For example, a part of the stream F is decoded into coefficients. The coefficients are de-quantized then if necessary transformed by an inverse transform to that used by the coding method in step 58. A residue block is thus obtained. According to a variant, the inverse transformation step is omitted notably if no transformation step has been applied on the coder side in step 58.

During a step 62, an atomic decomposition is applied. This step is identical to step 52 of the coding method. This step enables an approximation to be determined $\hat{Y}=AX_{opt}$ of the vector Y.

During a step 64, the vector $\hat{Y}_p$ of size $n^2$ that corresponds to the zone P is extracted from $\hat{Y}$ as shown in FIG. 8. The data $\hat{Y}_p$ extracted are reorganised (inverse operation to the vectoring operations) in block form. The reorganised data represent the new prediction block Bp of the current block.

During a step 66, the current block Bc is reconstructed by merging the prediction block Bp determined in step 64 and the residue block decoded in step 60, for example by addition pixel by pixel.

Figure 10:
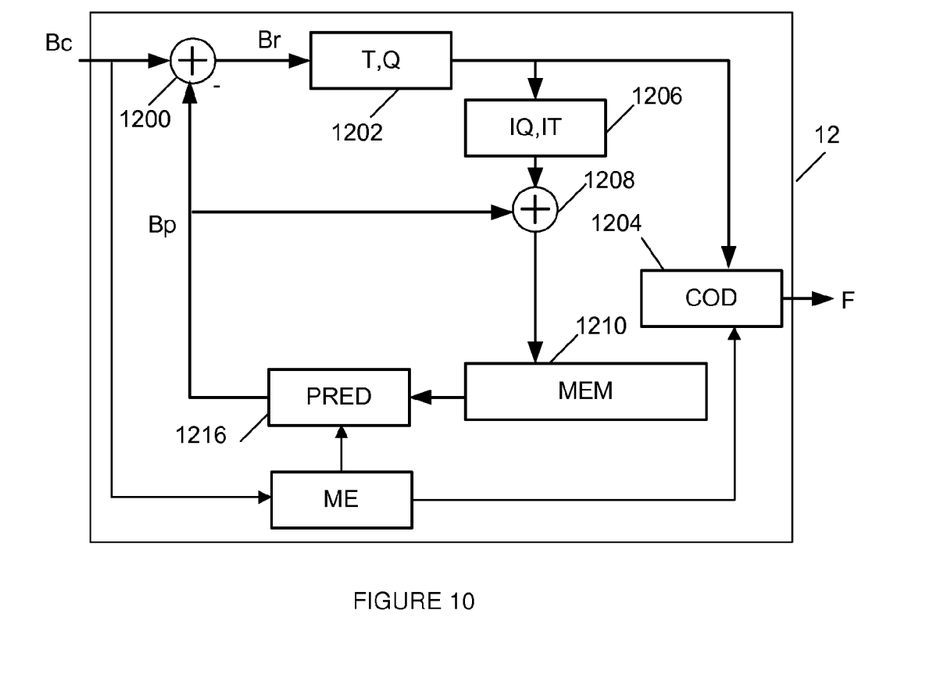
FIG. 10 shows a coding device according to the invention.

FIG. 10 diagrammatically shows a coding device 12. The coding device 12 receives at input an image or images. The coding device 12 is able to implement the coding method according to the invention described in reference to FIG. 7. Each image is divided into blocks of pixels with each of which is associated at least one item of image data. The coding device 12 notably implements a coding with temporal prediction. Only the modules of the coding device 12 relating to the coding by temporal prediction or INTER coding are shown in FIG. 10. Other modules known by those skilled in the art of video coders are not shown (for example selection of the coding mode, spatial prediction). The coding device 12 notably comprises a calculation module 1200 able to extract, for example by subtraction pixel by pixel, from a current block Bc a prediction block Bp to generate a residue block Br. The calculation module 1200 is able to implement step 56 of the coding method according to the invention. It further comprises a module 1202 able to transform then quantize the residue block Br into quantized data. The transform T is for example a Discrete Cosine Transform (DCT). The coding device 12 also comprises an entropy coding module 1204 able to code the quantized data into a stream F. It also comprises a module 1206 performing the inverse operation of the module 1202. The module 1206 carries out an inverse quantization $Q^{-1}$ followed by an inverse transformation $T^{-1}$. The module 1206 is connected to a calculation module 1208 capable of merging, for example by addition pixel by pixel, the block of data from the module 1206 and the prediction block Bp to generate a reconstructed block that is stored in a memory 1210.

A prediction module 1216 determines a prediction block. The prediction module 1216 is able to implement steps 52 and 54 of the coding method according to the invention.

Step 58 of the coding method is implemented in the modules 1202 and 1204.

Figure 11:
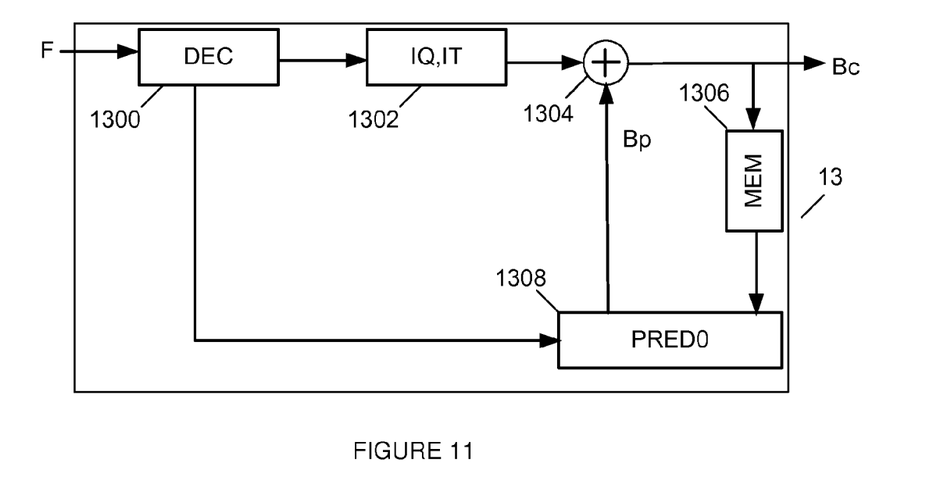
FIG. 11 shows a decoding device according to the invention.

FIG. 11 diagrammatically shows a decoding device 13. The decoding device 13 receives at input a stream F representative of an image. The stream F is for example transmitted by a coding device 12 via a channel. The decoding device 13 is able to implement the decoding method according to the invention described in reference to FIG. 9. The decoding device 13 comprises an entropy decoding module 1300 able to generate decoded data. The decoded data are then transmitted to a module 1302 able to carry out an inverse quantization followed by an inverse transform. The module 1302 is identical to the module 1206 of the coding device 12 having generated the stream F. The module 1302 is connected to a calculation module 1304 able to merge, for example by addition pixel by pixel, the block from the module 1302 and a prediction block BP to generate a reconstructed current block Bc that is stored in a memory 1306. The calculation module 1304 is able to implement step 66 of the reconstruction method. The decoding device 13 comprises a prediction module 1308. The prediction module 1308 determines a prediction block Bp from data already reconstructed stored in the memory 1306. The prediction module 1308 is able to implement steps 62 and 64 of the reconstruction method according to the invention. Step 60 of the reconstruction method is implemented in the modules 1300 and 1302.

Naturally, the invention is not limited to the embodiment examples mentioned above.

Figure 12:
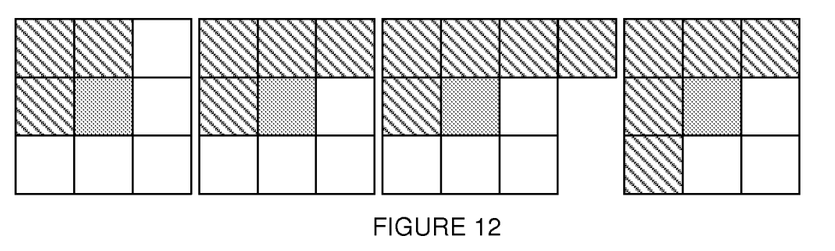
FIG. 12 shows different forms of causal zones.

In particular, those skilled in the art may apply any variant to the stated embodiments and combine them to benefit from their various advantages. In fact, other methods than the MP method can be used to determine the vector $X_{opt}$. Likewise the form of the causal zone can vary as shown in FIG. 12. In this figure, the causal zone taken into account is hatched. The invention is in no way limited to these forms of causal zones that are only shown as an illustrative example. In this figure the blocks are of any size. The causal zone can be in any position with respect to the prediction block, in the sense that the method according to the invention is independent of the scanning order of blocks in the image.

The form and size of patches can vary. Likewise the second dictionary can contain fewer patches than there are textured atoms in the first dictionary.

The invention claimed is:

1. A method for coding a current block of a sequence of images comprising the following steps of:
    decomposing iteratively, into atoms of a first dictionary, a vector of data comprising at least reconstructed image data associated with pixels located in a causal neighbourhood of said current block, said first dictionary comprising analytical atoms and textured atoms, and
    extracting from said decomposed vector data corresponding to said current block, said extracted data forming a prediction block,
    determining a residue block by extracting from said current block said prediction block,
    coding said residue block,
wherein, at each iteration, said step of decomposition into atoms comprises the following steps of:
    selecting a first atom in said first dictionary of atoms,
    applying a phase correlation between a patch and a current residue vector when said first atom is a textured atom, wherein said patch is associated with said first atom and is bigger than said first atom,
    extracting from said patch at least the part most correlated with said residue vector, said extracted part forming a second atom of same size as said first atom,
    selecting from among said first atom and said second atom, the atom most correlated with said current residue vector, and
    updating said residue vector according to said selected atom.

2. The method for coding according to claim 1, wherein the patches of the second dictionary are of circular symmetry.

3. The method for coding according to claim 1, wherein the patches of the second dictionary have a form that depends on their content.

4. The method for coding according to claim 1, wherein said second dictionary comprises at least two patches of different sizes.

5. The method for coding according to claim 1, wherein the step of extraction comprises the extraction of the N parts most correlated with said residue vector, each part extracted forming a re-phased atom and
    wherein the step of selection comprises the selection, from among said first atom and said re-phased atoms, of the atom most correlated with said current residue vector.

6. A method for reconstruction of a current block of a sequence of images arising in the form of a stream comprising the following steps of:
    decoding a residue block for said current block from said stream,
    decomposing iteratively, into atoms of a first dictionary, a vector of data comprising at least reconstructed image data associated with pixels located in a causal neighbourhood of said current block, said first dictionary comprising analytical atoms and textured atoms, extracting from said decomposed vector data corresponding to said current block, said extracted data forming a prediction block, reconstructing said current block by merging said decoded residue block and said prediction block, wherein, at each iteration, said step of decomposition into atoms comprises the following steps of:

selecting a first atom in said first dictionary of atoms, applying a phase correlation between a patch and a current residue vector when said first atom is a textured atom, wherein said patch is associated with said first atom and is bigger than said first atom, extracting from said patch at least the part most correlated with said residue vector, said extracted part forming a second atom of same size as said first atom, selecting from among said first atom and said second atom, the atom most correlated with said current residue vector, and updating said residue vector according to said selected atom.

7. The method for reconstruction according to claim 6, wherein the patches of the second dictionary are of circular symmetry.

8. The method for reconstruction according to claim 6, wherein the patches of the second dictionary have a form that depends on their content.

9. The method for reconstruction according to claim 6, wherein said second dictionary comprises at least two patches of different sizes.

10. The method for reconstruction according to claim 6, wherein the step of extraction comprises the extraction of the N parts most correlated with said residue vector, each part extracted forming a re-phased atom and wherein the step of selection comprises the selection, from among said first atom and said re-phased atoms, of the atom most correlated with said current residue vector.

11. A device for coding a current block of a sequence of images comprising:

a unit configured to decompose iteratively, into atoms of a first dictionary, a vector of data comprising at least reconstructed image data associated with pixels located in a causal neighbourhood of said current block, said first dictionary comprising analytical atoms and textured atoms, and a unit configured to extract from said decomposed vector data corresponding to said current block, said extracted data forming a prediction block, a unit configured to determine a residue block by extracting from said current block said prediction block, a coder for coding said residue block, wherein said unit configured to decompose iteratively the vector of data into atoms of a first dictionary comprises:

a selector configured to select a first atom in said first dictionary of atoms, a unit configured to apply a phase correlation between a patch and a current residue vector when said first atom is a textured atom, wherein said patch is associated with said first atom and is bigger than said first atom, a unit configured to extract from said patch at least the part most correlated with said residue vector, said extracted part forming a second atom of same size as said first atom, a selector configured to select from among said first atom and said second atom, the atom most correlated with said current residue vector, and a unit configured to update said residue vector according to said selected atom.

12. The device for coding according to claim 11, wherein said device is adapted to execute the steps of the coding method.

13. A decoding device for reconstruction of a current block of a sequence of images arising in the form of a stream comprising:

a decoder for decoding a residue block for said current block from said stream, a unit configured to decompose iteratively, into atoms of a first dictionary, a vector of data comprising at least reconstructed image data associated with pixels located in a causal neighbourhood of said current block, said first dictionary comprising analytical atoms and textured atoms, a unit configured to extract from said decomposed vector data corresponding to said current block, said extracted data forming a prediction block, a unit configured to reconstruct said current block by merging said decoded residue block and said prediction block, wherein said unit configured to decompose iteratively the vector of data into atoms of a first dictionary comprises:

a selector configured to select a first atom in said first dictionary of atoms, a unit configured to apply a phase correlation between a patch and a current residue vector when said first atom is a textured atom, wherein said patch is associated with said first atom and is bigger than said first atom, a unit configured to extract from said patch at least the part most correlated with said residue vector, said extracted part forming a second atom of same size as said first atom, a selector configured to select from among said first atom and said second atom, the atom most correlated with said current residue vector, and a unit configured to update said residue vector according to said selected atom.

14. The decoding device according to claim 13, wherein said device is adapted to execute the steps of the method for reconstruction.

* * * * *